Patented Dec. 18, 1928.

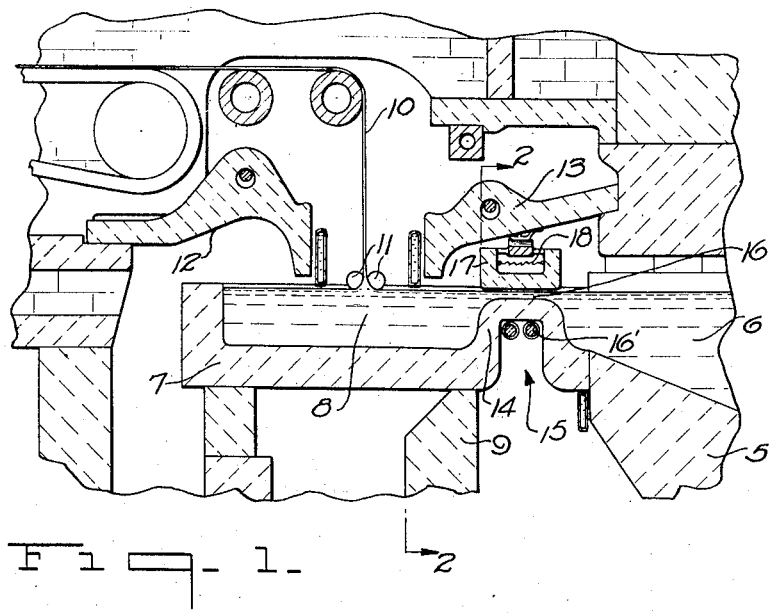

1,695,538

UNITED STATES PATENT OFFICE.

JOHN L. DRAKE, OF TOLEDO, OHIO, ASSIGNOR TO THE LIBBEY-OWENS SHEET GLASS COMPANY, OF TOLEDO, OHIO, A CORPORATION OF OHIO.

METHOD AND MEANS FOR TREATING GLASS.

Application filed September 7, 1926. Serial No. 133,788.

The present invention relates to glass apparatus.

An important object of the invention is to provide in glass apparatus, including sheet glass apparatus, means for conditioning glass before it is formed into an article such as a sheet.

Another object of the invention is to provide in sheet glass apparatus a tank furnace and a pot communicating therewith, and including means arranged substantially at the juncture of the tank and pot for creating a throat through which the glass is flowed.

Another object of the invention is to provide means wherein a mass of molten glass is flowed from a tank furnace into a draw pot, the pot having a wall contained therein over which the glass flows, the height of said wall being such that the glass passing thereover is in the form of a relatively thin film so that this film can be suitably heat treated as desired.

Still another object is to provide in glass apparatus of this nature means for reducing a flow of glass passing from a tank furnace or other source of supply into a working chamber or draw pot to a relatively thin film or shallow flow, the apparatus including means for electrically heating the said film.

A still further object of the invention is to provide in sheet glass apparatus a draw pot having a wall therein, and over which a relatively shallow stream of glass is permitted to pass, and a heated slab arranged above the wall for suitably heat treating the said shallow stream.

Other objects and advantages of the invention will become apparent during the course of the following description.

In the drawings wherein like numerals are employed to designate like parts throughout the same, Fig. 1 is a fragmentary vertical longitudinally section through a portion of a glass apparatus illustrating my invention in use, and Fig. 2 is a section taken on line 2—2 in Fig. 1, and looking in the direction of the arrows.

The present invention is disclosed in connection with a type of sheet glass drawing machine known in the art as the Colburn machine, but it is to be specifically understood that the invention is not necessarily limited to such machine as it is primarily designed to produce means whereby a quantity of glass may be suitably treated by the action of heat before it is made into commercial articles.

In the drawings the numeral 5 designates the exit end of a tank furnace or like receptacle, which contains a mass of molten glass 6.

The numeral 7 designates a draw pot or other form of working receptacle, and contains a mass of molten glass 8 continuously supplied from the source 6. The pot may be supported in a suitable compartment on the stools 9.

A sheet 10 is continuously drawn from the mass 8, the said sheet being held to width by the edge engaging means 11. Arranged over the glass is a pair of lip tiles 12 and 13.

The major portion of the sheet 10 is believed to be formed from the surface glass contained in the pot 7. It is well known in the art that it is extremely difficult to create a mass of molten glass that can be formed into a sheet free from bubbles and the like which are known as seeds and blisters. Seeds and blisters and like defects are bubbles formed by trapped gases. Due to the differences in batch materials and the difficulty in accurately controlling the heat used in creating molten glass, it is almost impossible to remove all of these pockets of trapped gases with the constructions now known.

In accordance with the present invention, after the glass has been refined, as is ordinarily done in sheet glass manufacture, and as it is being introduced into the draw pot, it is subjected to a heat treatment designed to permit the trapped gases to escape.

In the form of construction illustrated, the bottom of the pot 7 has rising therefrom a wall or projection 14 containing a recessed part 15, in which may be arranged suitable heating elements 16'. The height of the wall 14 is preferably such that the mass of molten glass 6 flowing into the pot 7 is reduced to a relatively shallow flow 16. Arranged preferably directly above the wall 14 is a slab 17, heated by means of the electrical elements 18 or gas burners, as desired. By controlling the temperature of the heating elements 16 and 18, the glass in film formation, as at 16, may be so heated that the glass will be fluent enough to permit an escape of bubbles. Due to the shallowness of the flow of glass and the viscosity thereof, bubbles can move from the lowest portion of the flow 16 upwardly and escape, so that the mass 8 from which the sheet 10 is produced will be, practically speaking, a homogeneous mass free from pockets of trapped gases.

Obviously, by improving the quality of glass from which the sheet is produced, the finished product will be superior to anything produced without such a heat treatment. Although the location of the wall 14 and slab 17 is preferably as illustrated, it is to be understood that they can be arranged further away from the base of the sheet or closer, and if desired, a plurality of such means may be utilized to form a throat through which the molten glass passes, the said glass being subjected to the desired temperature.

By reducing the flow of glass to a relatively thin film, the distance the bubbles have to travel to escape is so slight that practically every one will be removed. In some cases it will not be necessary to elevate the temperature of the glass, although I preferably raise the temperature of the glass, when it is in film formation, a slight degree.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In glass apparatus, a tank containing a mass of molten glass, a pot communicating therewith, an upwardly extending projection arranged in the glass and over which the glass flows, means for heating the glass as it passes over said projection, and means for drawing a sheet vertically from said pot.

2. In glass apparatus, a tank containing a mass of molten glass, a pot communicating therewith, and an electrically heated throat through which the glass passes arranged between the furnace and pot.

3. In glass apparatus, a tank containing a mass of molten glass, a pot communicating therewith, means carried by the pot over which the glass passes in relatively thin film, and means for heating said film throughout its entire depth, and means for drawing a sheet vertically from said pot.

4. In glass apparatus, a tank furnace containing a mass of molten glass, a draw pot in communication therewith, an upwardly extending projection formed on the wall of the pot, and a heated slab arranged over the projection for heating the glass as it passes between the two.

5. In sheet glass apparatus, a tank furnace containing a mass of molten glass, a draw pot associated therewith, an upwardly extending projection formed on the wall of the pot, means for heating the projection internally thereof, and a heated slab arranged over the projection for heating the glass as it passes between the two.

6. In glass apparatus, a tank furnace containing a mass of molten glass, a working receptacle associated therewith, means for causing a relatively shallow flow of glass from the tank into the receptacle, a slab arranged above the shallow flow of glass, and means for heating the slab.

7. In glass apparatus, a tank furnace containing a mass of molten glass, a working receptacle associated therewith, means for causing a relatively shallow flow of glass from the tank into the receptacle, and an electrically heated slab above the shallow flow of glass.

8. In glass apparatus, a tank furnace containing a mass of molten glass, a working receptacle associated therewith, means for causing a relatively shallow flow of glass from the tank into the receptacle, a slab above the shallow flow of glass, means for heating the slab, and auxiliary heating means arranged below the shallow flow of glass.

9. In glass apparatus, a tank furnace containing a mass of molten glass, a working receptacle associated therewith, a projection carried by said receptacle and over which a relatively shallow flow of glass is adapted to pass from the tank into the receptacle, a slab arranged above the glass passing over said projection, and means for heating the slab.

10. In glass apparatus, a tank furnace containing a mass of molten glass, a working receptacle associated therewith, a projection carried by said receptacle and over which a relatively shallow flow of glass is adapted to pass from the tank into the receptacle, a slab arranged above the glass passing over said projection, means for heating the slab, and auxiliary heating means positioned beneath the projection.

11. In glass apparatus, a tank containing a mass of molten glass, a receptacle communicating therewith, a throat arranged between the tank and receptacle and through which the glass is adapted to pass in relatively thin film form, and means for electrically heating the throat only.

12. In glass apparatus, a tank containing a mass of molten glass, a receptacle communicating therewith, a throat arranged between the tank and receptacle and through which the glass is adapted to pass in relatively thin film form, and electrical heating means arranged both above and beneath the throat for heating that portion only of the glass passing therethrough.

13. The method of treating glass, which consists in establishing a mass of molten glass in a container, flowing a relatively thin film of glass through a restricted passage from said mass into a second container, and in heating the glass as it passes through said restricted passage by radiated heat only.

14. The method of treating glass, which consists in establishing a mass of molten glass in a container, flowing a relatively thin film of glass through a restricted passage from said mass into a second container, and in heating the restricted passage from above and beneath by radiated heat.

15. The method of treating glass, which consists in establishing a mass of molten glass in a container, flowing a relatively thin film of glass through a restricted passage from said mass into a second container, and in electrically heating that portion of the glass only flowing through said restricted passage.

Signed at Toledo, in the county of Lucas and State of Ohio, this 3rd day of September, 1926.

JOHN L. DRAKE.